Nov. 14, 1967     J. G. ABRAHAM     3,352,152

LOAD MEASURING WINDLASS

Filed Nov. 30, 1966     3 Sheets-Sheet 1

JAMES G. ABRAHAM
INVENTOR.

BY *Lyon & Lyon*

ATTORNEYS

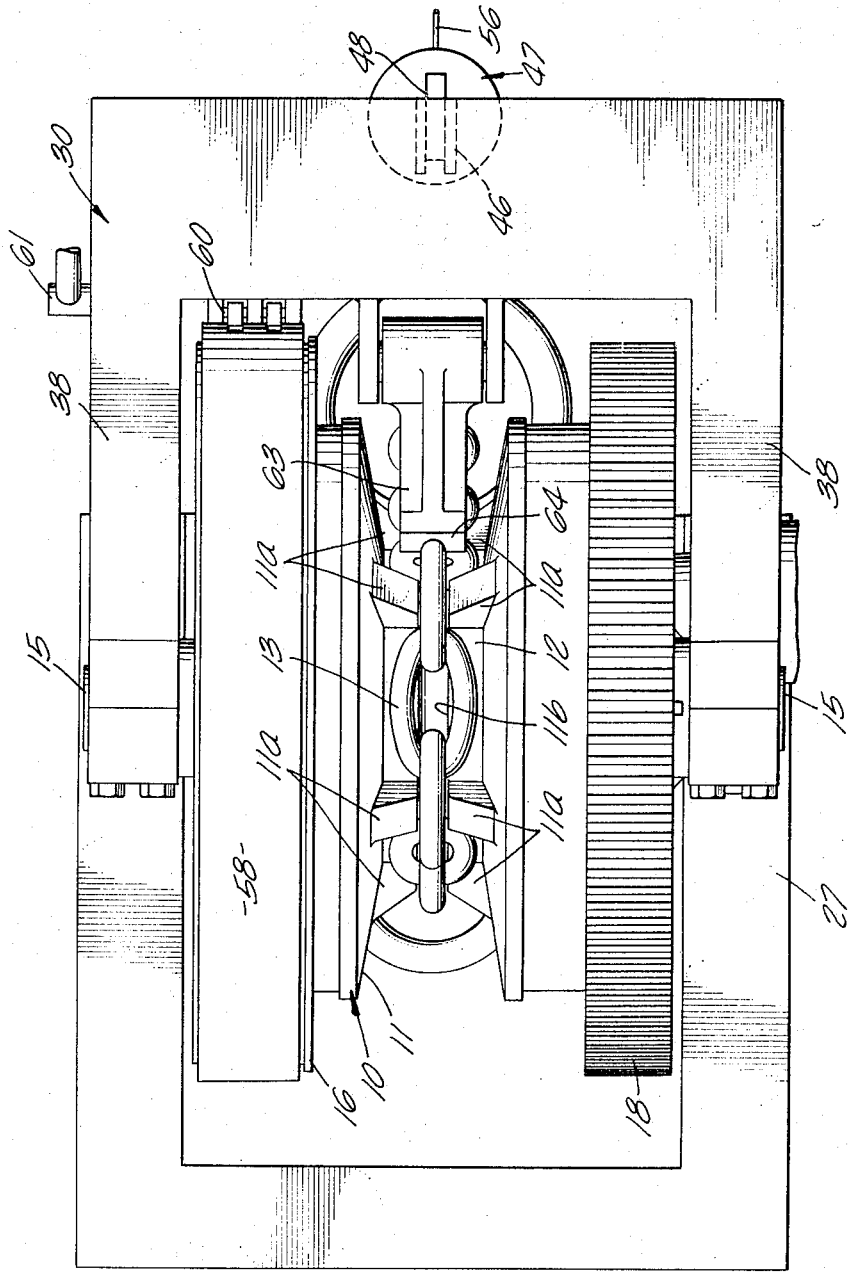

United States Patent Office 3,352,152
Patented Nov. 14, 1967

3,352,152
LOAD MEASURING WINDLASS
James G. Abraham, Rolling Hills, Calif., assignor to Armco Steel Corporation, Middletown, Ohio, a corporation of Ohio
Filed Nov. 30, 1966, Ser. No. 597,971
10 Claims. (Cl. 73—143)

This invention relates to a windlass for handling an elongated flexible tension element such as a chain, and for measuring the tension in the chain. This invention finds particular usefulness in connection with the tensioning of anchor chains for holding a floating vessel in fixed position over a well head on the ocean floor, so that drilling operations can be conducted from the floating vessel through the well head.

Conventional practice is to employ a windlass having a power-driven drum mounted to turn on a stationary frame, and then to measure the chain tension with auxiliary devices such as load cells provided on fair-leads or chain stoppers, or strain gages mounted on the windlass shafting or frame.

It is the principal object of the present invention to provide a novel windlass which provides for tension measurement in the chain as a basic part of the windlass structure, and this feature permits the use of a single load measuring device to give direct indication of chain tension under all conditions: paying out with a friction brake, hauling in, or holding with a lock pawl.

Other objects of this invention are to provide a load measuring windlass which can be used with any conventional source of power and including a gear drive to the drum, to provide such a device in which the pinion gear diameter in the gear drive can be maintained at a minimum in order to minimize the torque requirement in the drive shaft, and to provide such a device in which any number of drums can be driven from a single power source and gear train without affecting the tension measuring system and without any requirement for Cardanshafts or flexible couplings.

These and other objects are achieved by providing a drum to turn on a yoke, and providing a support for the yoke for pivotal movement about an axis parallel to the drum axis and intersecting the pitch point of the meshing gears for driving the drum. The torque load on the yoke then provides a measurement which is directly proportional to the tension in the chain engaging the drum. The coincidence of the effective pivot point of the yoke with the pitch point of the meshing gears prevents the gear force from imparting any turning moment to the yoke. The yoke carries the brake band anchor and brake operating mechanism for a brake rim carried on the drum. The yoke also carries a pivoted chain stopper pawl for direct engagement with the chain or drum. The measured torque load on the yoke then furnishes a measure of the tension in the chain, whether the chain is being hauled in under power, paid out by using the friction brake mechanism, or held stationary by means of the pawl. The effective pivotal mounting of the yoke at the pitch point of the meshing gears allows the yoke ample angular motion with respect to the stationary frame to actuate any desired form of load measuring device without any significant effect on the meshing of the gears.

Referring to the drawings,

FIGURE 3 is a top plan view.

Figure 1:
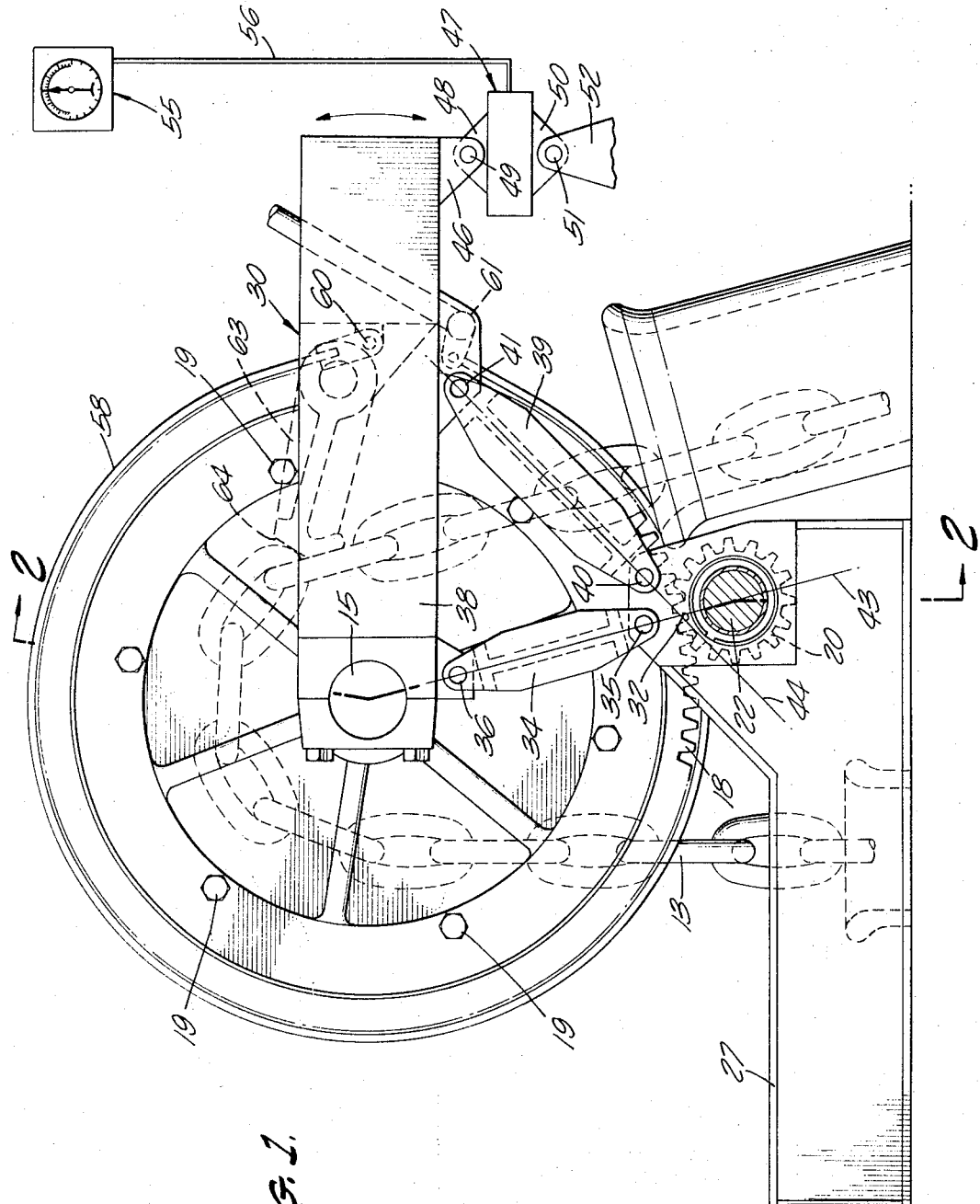
FIGURE 1 is a side elevation showing a preferred embodiment of this invention.
Figure 2:
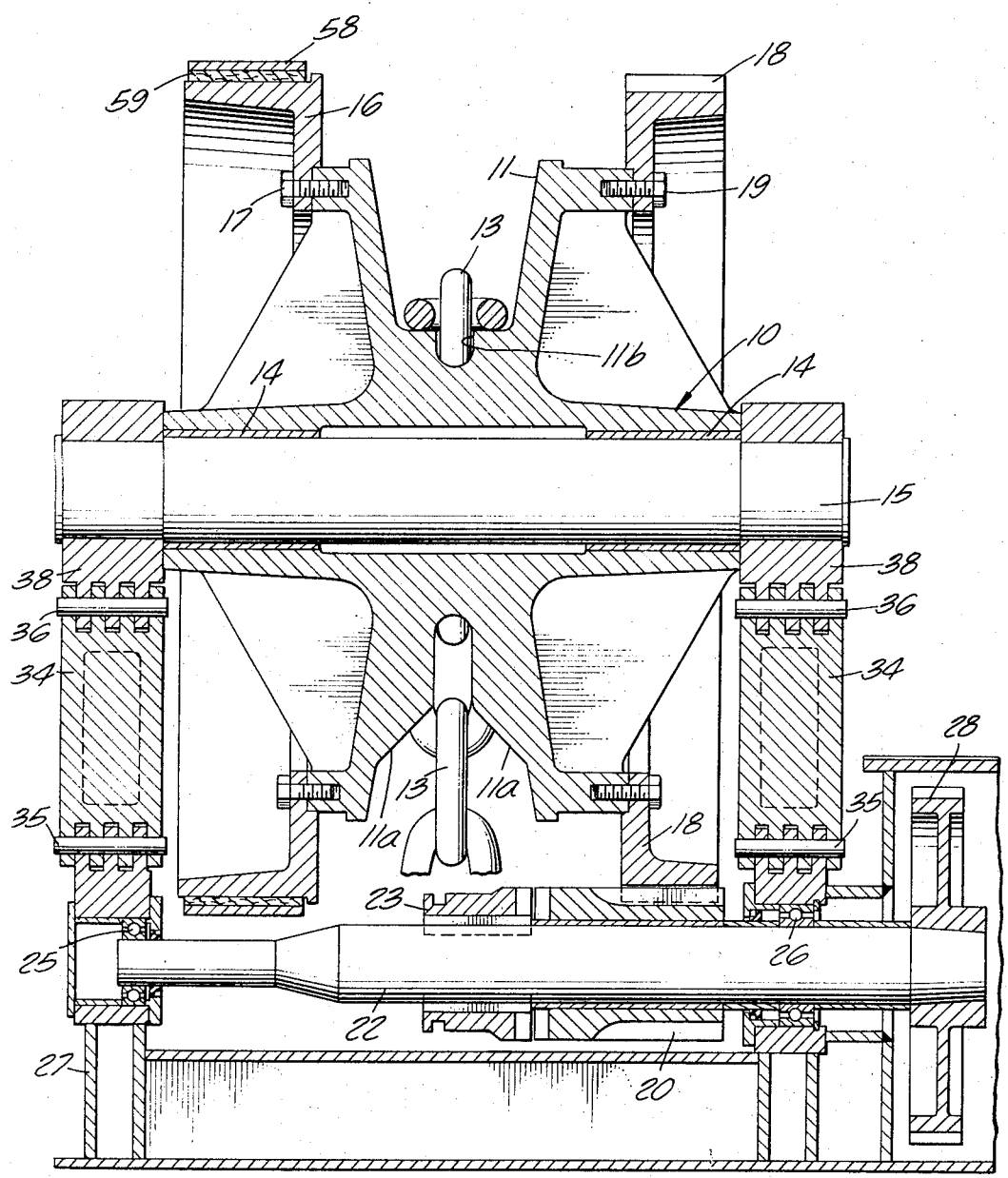
FIGURE 2 is a sectional elevation taken substantially on the lines 2—2 as shown in FIGURE 1.

Referring to the drawings, the drum or "wildcat" 10 is provided with the usual chain-receiving channel 11 having lugs 11a and having a bottom surface provided with a continuous groove 11b. The lugs and groove form pockets 12 shaped to fit the links of an anchor chain 13. The drum 10 is provided with axially spaced bearings 14 so that it may turn on a supporting shaft 15. A brake rim 16 is secured by fastenings 17 to the drum 10 at one side of the groove 11, and a driven gear 18 is secured by fastenings 19 to the drum 10 on the other side of the groove 11. The gear 18 meshes with a pinion gear 20 mounted to turn on the drive shaft 22. A clutch 23 keyed to the shaft 22 enables the pinion gear 20 to be placed in driving relationship with the shaft 22, for driving the gear 18 and drum 10. The shaft 22 is mounted in axially spaced bearings 25 and 26 mounted on the stationary frame 27. The shaft 22 may be driven by any convenient means such as, for example, the gear 28 fixed to the end of the shaft.

In accordance with the invention, the drum 10 is supported on a yoke generally designated 30, and this yoke is mounted on the base 27 for pivotal movement about an axis which intersects the pitch point 32 of the meshing gears 18 and 20. A pair of struts 34 is provided, and each has a pivot pin 35 at one end connected to the frame 27, and each has a pivot pin 36 at the other end connected to the arms 38 of the yoke 30. Similarly, a pair of struts 39 is provided, and each has a pivot pin 40 at one end connected to the frame 27 and each has a pivot pin 41 at the other end connected to the yoke arms 38. The parallel axes of the pivot pins 35 and 36 define a first plane 43, and the parallel axes of the pivot pins 40 and 41 define another plane 44. These two planes 43 and 44 intersect at the pitch point 32 between the meshing gears 18 and 20. The spacing of the pins 35 and 40 on the frame 27 is much closer than the spacing of the pins 36 and 41 on the yoke arms 38.

The mounting of the yoke 30 on the base 27 by means of the struts 34 and 39 and their respective pivot pins permits the yoke 30 to pivot through a small arc relative to the base without adversely affecting the meshing of the gears 20 and 18. This small angular movement gives sufficient travel at the extending end of the yoke lever 46 to operate the load measuring capsule generally designated 47. This device has one part 48 pivotally connected at 49 to the lever 46, and has another part 50 pivotally connected at 51 to the stationary support 52. The load capsule 47 may take any convenient form and may be similar to that shown in the Gillett Patent 3,056,287. A conventional load indicator mechanism 55 may be connected to the load capsule 47 through line 56, and may be calibrated to show the tension force in the chain 13.

The coincidence of the effective pivot point of the yoke 30 with the pitch point 32 of the meshing gears 18 and 20 prevents the gear forces from imparting any turning moment to the yoke 30. The force applied by the lever 46 to the capsule 47 is directly proportional to the tension in the chain 13 when the drum 10 is driven by the gearing 20 and 18. Moreover, the use of the struts 34 and 39 permits pivoting of the yoke above the drive shaft 22 with ample room for mounting of the shaft and its bearings. The diameter of the pinion gear 20 can be held to a minimum which in turn holds the required shaft troque to a minimum.

A brake band 58 having suitable friction lining 59 is trained over the brake rim 16 and has one end fixed to the yoke arm 38 at 60. The other end of the band 58 is connected to the brake operating mechanism 61 also mounted on the yoke arm 38. Accordingly, the friction brake band may be used to hold the drum 10 from turning or may be used to pay out the anchor chain 13 under load. In either event the indicator 55 provides a measure of the tension in the anchor chain 13. Also, a lock pawl 63 is pivotally mounted on the yoke 30 and has a swinging end 64 adapted to engage an abutment on the drum or to engage one of the chain links to prevent movement of the chain. Since the pawl 63 is carried on the yoke 30, the indicator 55 shows the tension in the anchor chain 13 when the pawl is engaged. From the foregoing description it will be understood that a direct indication of chain tension is provided under all conditions, whether hauling in under power through the gearing 20, 18, or paying out with the friction brake, or holding stationary with the lock pawl.

Any desired number of drums can be driven from a single power source and gear train without affecting the measuring system and without requiring flexible coupling or Cardan shafts.

Having fully described my invention, it is to be understood that I am not to be limited to the details herein set forth but that my invention is of the full scope of the appended claims.

I claim:

1. In a load-measuring windlass, the combination of: a drum adapted to receive an elongated tension member, a yoke, means mounting said drum for rotation on said yoke, a stationary base, a pinion gear, means on said base supporting said pinion gear for rotation about an axis parallel to the rotary axis of said drum, a gear fixed on said drum and meshing with said pinion gear, means on said base supporting said yoke for pivotal movement about an axis parallel to the drum axis and intersecting the pitch point of said meshing gears, and means for measuring the torque load on said yoke.

2. The combination set forth in claim 1 in which means are provided on the yoke to impede rotation of said drum.

3. The combination set forth in claim 1 in which a brake rim is fixed on the drum and encircled by a brake band mounted on the yoke for frictionally restraining rotation of the drum.

4. The combination set forth in claim 1 in which a pawl is pivotally mounted on the yoke for preventing rotation of the drum.

5. The combination set forth in claim 1 in which the tension element is a chain and wherein the drum is provided with pockets for reception of links of the chain.

6. In a load-measuring windlass, the combination of: a drum adapted to receive an elongated tension member, a yoke, means mounting said drum for rotation on said yoke, a stationary base, a pinion gear, means on said base supporting said pinion gear for rotation about an axis parallel to the rotary axis of said drum, a gear fixed on said drum and meshing with said pinion gear, first and second pairs of struts, each pair having spaced pivots for connecting one end of said struts to said base and the other end to said yoke, the axes of the pivots of the first pair of struts lying in a common plane, the axes of the pivots of the second pair of struts lying in another common plane, said planes intersecting at the pitch point of said meshing gears, and means for measuring the torque load on said yoke.

7. The combination set forth in claim 6 in which a brake rim is fixed on the drum and encircled by a brake band mounted on the yoke for frictionally restraining rotation of the drum.

8. The combination set forth in claim 6 in which a pawl is pivotally mounted on the yoke for preventing rotation of the drum.

9. The combination set forth in claim 6 in which the tension element is a chain and wherein the drum is provided with pockets for reception of links of the chain.

10. In a load-measuring windlass, the combination of: a drum adapted to receive an elongated tension member, a yoke having laterally spaced arms, means supporting said drum for rotation on said yoke arms, a stationary base, a pinion gear, a shaft mounted to rotate on said base about an axis parallel to the rotary axis of said drum, a pinion gear on said shaft, a gear fixed on said drum and meshing with said pinion gear, first and second pairs of struts, each pair having lower pivots for connecting one end of said struts to said base, each pair having upper pivots for connecting the other end of said struts to said yoke arms, the lower pivots for the pairs of struts being more closely spaced than the upper pivots, the axes of the pivots of the first pair of struts lying in a common plane, the axes of the pivots of the second pair of struts lying in another common plane, said planes intersecting at the pitch point of said meshing gears, and means for measuring the torque load on said yoke.

References Cited

UNITED STATES PATENTS

| 1,692,057 | 11/1928 | Smith | 73—144 |
| 3,056,287 | 10/1962 | Gillett | 73—143 |

EVON C. BLUNK, *Primary Examiner.*

H. C. HORNSBY, *Assistant Examiner.*